United States Patent
Joergensen

(10) Patent No.: US 12,294,451 B2
(45) Date of Patent: May 6, 2025

(54) SYSTEM AND METHODS FOR NETWORK DATA PROCESSING

(71) Applicant: Microchip Technology Incorporated, Chandler, AZ (US)

(72) Inventor: Thomas Joergensen, Soeborg (DK)

(73) Assignee: Microchip Technology Incorporated, Chandler, AZ (US)

( * ) Notice: Subject to any disclaimer, the term of this patent is extended or adjusted under 35 U.S.C. 154(b) by 304 days.

(21) Appl. No.: 18/098,228

(22) Filed: Jan. 18, 2023

(65) Prior Publication Data

US 2024/0089021 A1 Mar. 14, 2024

Related U.S. Application Data

(60) Provisional application No. 63/404,710, filed on Sep. 8, 2022.

(51) Int. Cl.
*H04J 3/06* (2006.01)

(52) U.S. Cl.
CPC .................................. *H04J 3/0667* (2013.01)

(58) Field of Classification Search
CPC .............................. H04L 5/14; H04J 3/0667
See application file for complete search history.

(56) References Cited

U.S. PATENT DOCUMENTS

| | | | | |
|---|---|---|---|---|
| 8,625,640 B2 * | 1/2014 | Wei | ....................... | H04J 3/0655 370/503 |
| 8,644,348 B2 * | 2/2014 | Zampetti | ............... | H04J 3/0667 370/503 |
| 8,842,994 B2 * | 9/2014 | Lanzone | .................. | H04J 3/065 398/154 |
| 8,873,588 B2 * | 10/2014 | Joergensen | ........... | H04J 3/0673 370/503 |
| 9,391,768 B2 * | 7/2016 | Roberts | .............. | H04Q 11/0001 |
| 9,515,908 B2 * | 12/2016 | Hayes | ................. | H04L 43/0864 |

(Continued)

FOREIGN PATENT DOCUMENTS

| | | | | |
|---|---|---|---|---|
| CN | 111800213 A | 10/2020 | ................ | H04J 3/06 |
| EP | 2595331 A2 | 5/2013 | ................ | H04J 3/06 |
| WO | 2019/023515 A1 | 1/2019 | ................ | H04J 7/00 |

OTHER PUBLICATIONS

Köhler, Daniel, "A Practical Implementation of an IEEE1588 Supporting Ethernet Switch," 2007 International IEEE Symposium on Precision Clock Synchronization for Measurement, Control, and Communication, pp. 134-137, Oct. 1, 2007.

(Continued)

*Primary Examiner* — Bailor C Hsu
(74) *Attorney, Agent, or Firm* — SLAYDEN GRUBERT BEARD LLC

(57) ABSTRACT

A system for network data transactions, the system including an ingress port to receive data frames and timestamp received data frames, a frame analyzer to forward the data frames to a processor, the processor to extract timing information from the data frames and update the data frames based on updated timing calculations and output updated data frames via one or more egress ports. Data frames are timestamped at ingress and egress ports, and egress timestamps are saved in a timestamp memory. The system reduces overall network delays by using dedicated hardware and stored timestamp information.

12 Claims, 4 Drawing Sheets

(56) References Cited

U.S. PATENT DOCUMENTS

| | | | | |
|---|---|---|---|---|
| 9,665,121 B2* | 5/2017 | Aweya | | G06F 1/10 |
| 10,250,379 B2* | 4/2019 | Haddad | | H04L 7/0331 |
| 10,432,553 B2* | 10/2019 | Tse | | H04N 21/2365 |
| 10,855,388 B2* | 12/2020 | Joseph | | H04J 3/0667 |
| 11,177,897 B2* | 11/2021 | Evans | | H04J 3/0673 |
| 11,533,327 B2* | 12/2022 | Weber | | H04L 69/324 |
| 2012/0014377 A1 | 1/2012 | Joergensen et al. | | 370/352 |
| 2012/0119359 A1 | 5/2012 | Im et al. | | 257/737 |
| 2017/0150464 A1* | 5/2017 | Kazehaya | | H04L 12/422 |
| 2024/0364417 A1* | 10/2024 | Ambeskar | | H04B 7/18519 |

OTHER PUBLICATIONS

Diarra, Aboubacar et al., "Improved Clock Synchronization Start-Up Time for Ethernet AVB-Based In-Vehicle Networks," 2015 IEEE 20$^{th}$ Conference on Emerging Technology & Factory Automation, 8 pages, Sep. 8, 2015.

Schungel, Maximilian et al., "Analysis of Time Synchronization for Converged Wired and Wireless Networks," 2020 25th IEEE International Conference on Emerging Technologies and Factory Automation, vol. 1, pp. 198-205, Sep. 8, 2020.

International Search Report and Written Opinion, Application No. PCT/US2023/073642, 16 pages, Dec. 13, 2023.

\* cited by examiner

SYSTEM AND METHODS FOR NETWORK DATA PROCESSING

RELATED PATENT APPLICATION

This application claims priority to commonly owned U.S. Patent Application No. 63/404,710 filed Sep. 8, 2022, the entire contents of which are hereby incorporated by reference for all purposes.

TECHNICAL FIELD

The present disclosure relates to network data processing, and more particularly to processing of network transactions in a packet-switched communication network.

BACKGROUND

Clock synchronization is important in many network communication applications, such as real-time audio and video transmission. Many such networks use Ethernet as a communication medium. In such systems, it may be advantageous for devices in the network to have a common timebase. The common timebase may be used, for example, to trigger coordinated measurement actions in a network of sensors, to coordinate actions of controllers in an industrial system, or to synchronize clocks of mobile/cellular radio base stations. In addition to sensors, controllers, and radio base stations, the system may include computers and communication devices, such as routers and switches.

The IEEE802.1AS protocol, also called Generalized Precision Time Protocol (gPTP), is one protocol for accurately transferring time information over Ethernet networks. It is designed to be a software protocol and was initially targeted to Audio-Video Bridging (AVB) networks, but has recently been re-purposed for Time Sensitive Networking (TSN) applications, including low-latency networks and industrial automation.

In the IEEE802.1AS protocol, frames are forwarded to a local central processing unit (CPU) in the switch that receives the frames and performs frame modifications. These software operations in a local CPU significantly increase the time that the data frames are inside the Ethernet switch, called the residence time, since the software processing is much slower than the hardware forwarding.

The gPTP protocol also runs a separate software routine that measures the frequency difference between the local timebase in the Ethernet switch and the gPTP grandmaster clock source. The calculation of the frequency difference between the local timebase and the grandmaster clock source is a product of calculations done in all previous gPTP bridges between the grandmaster clock source and respective individual bridges and is impacted by the timestamp accuracy of these systems, so the accuracy of this frequency difference will deteriorate with the number of nodes in a given network.

The accuracy of the residence time depends on the accuracy of the measured RateRatio (frequency difference between the local time reference and the grandmaster clock source time reference) and is multiplied by the residence time, so keeping the residence time low is the best way to increase the time transfer accuracy of a gPTP bridge.

A solution is needed to reduce the residence time in network data processing.

SUMMARY

A device comprising an ingress port comprising a timestamp circuit to determine a first timestamp information based on a received data frame and to update the received data frame based on the first timestamp information to create a timestamped data frame, the ingress port to output the timestamped data frame, an output circuit comprising one or more egress ports to receive updated and timestamped data frames and modified and timestamp data frames, wherein the egress ports comprise a timestamp circuit to determine egress timestamp information and to save egress timestamp information to a timestamp memory, the output circuit to output data frame, a frame analyzer to receive the timestamped data frame from the ingress port and forward the timestamped data frame to a processor, the processor comprising a timestamp extractor to extract the first timestamp information from the timestamped data frame and to read egress timestamp information from the timestamp memory, a time calculator with inputs coupled to receive the first timestamp information and egress timestamp information, the time calculator to calculate a residence time based at least on the first timestamp information and egress timestamp information, a clock rate extractor to extract clock rate information from the timestamped data frame, a clock rate calculator to receive the extracted clock rate information from the clock rate extractor, and to update one or more clock rate parameters, a frame generator with an output coupled to provide data frames to the output circuit, the frame generator to generate a data frame based at least on updated clock rate parameters from the clock rate calculator, and a rewriter circuit with an input coupled to the output of the frame analyzer, the rewriter circuit to modify the received data frame from the frame analyzer and to output the modified and timestamped data frame to the one or more egress ports of the output circuit.

A system including a plurality of network devices, wherein respective ones of a plurality of network devices are coupled to at least one other of the plurality of network devices, each respective ones of the network devices comprising an ingress port comprising a timestamp circuit to determine a first timestamp information based on a received data frame and to update the received data frame based on the first timestamp information to create a timestamped data frame, the ingress port to output the timestamped data frame, an output circuit comprising one or more egress ports to receive updated and timestamped data frames and modified and timestamp data frames, wherein the egress ports comprise a timestamp circuit to determine egress timestamp information and save egress timestamp information to a timestamp memory, the output circuit to output data frames, a frame analyzer to receive the timestamped data frame from the ingress port and forward the timestamped data frame to a processor, the processor comprising a timestamp extractor to extract the first timestamp information from the timestamped data frame and to read egress timestamp information from a timestamp memory, a time calculator with inputs coupled to receive the first timestamp information and the egress timestamp information, the time calculator to calculate a time value based at least on the first timestamp information and the egress timestamp information, a clock rate extractor to extract clock rate information from the timestamped data frame, a clock rate calculator to receive the extracted clock rate information from the clock rate extractor and to update one or more clock rate parameters, a frame generator with an output coupled to provide data frames to the output circuit, the frame generator to generate a data frame based at least on updated clock rate parameters from the clock rate calculator, and a rewriter circuit with an input coupled to the output of the frame analyzer, the rewriter circuit to modify the received data frame from the frame analyzer and to output the modified and timestamped data frame to the one or more egress ports of the output circuit.

A method comprising receiving a first data frame at an ingress port and generating a first timestamped data frame at the ingress port, transmitting first timestamped data frame to a processor, extracting the first timestamp information from the first data frame, reading a second timestamp information from a timestamp memory, calculating residence times and peer delays based on the first and second timestamp information, extracting clock rate information from the first data frame, calculating updated clock rate information based at least on the extracted clock rate information, generating an updated and timestamped data frame based at least on the updated clock rate information, and transmitting the updated and timestamped data frame on an egress port.

BRIEF DESCRIPTION OF THE FIGURES

The accompanying figures illustrate systems and methods for network data processing.

DESCRIPTION

Figure 1:
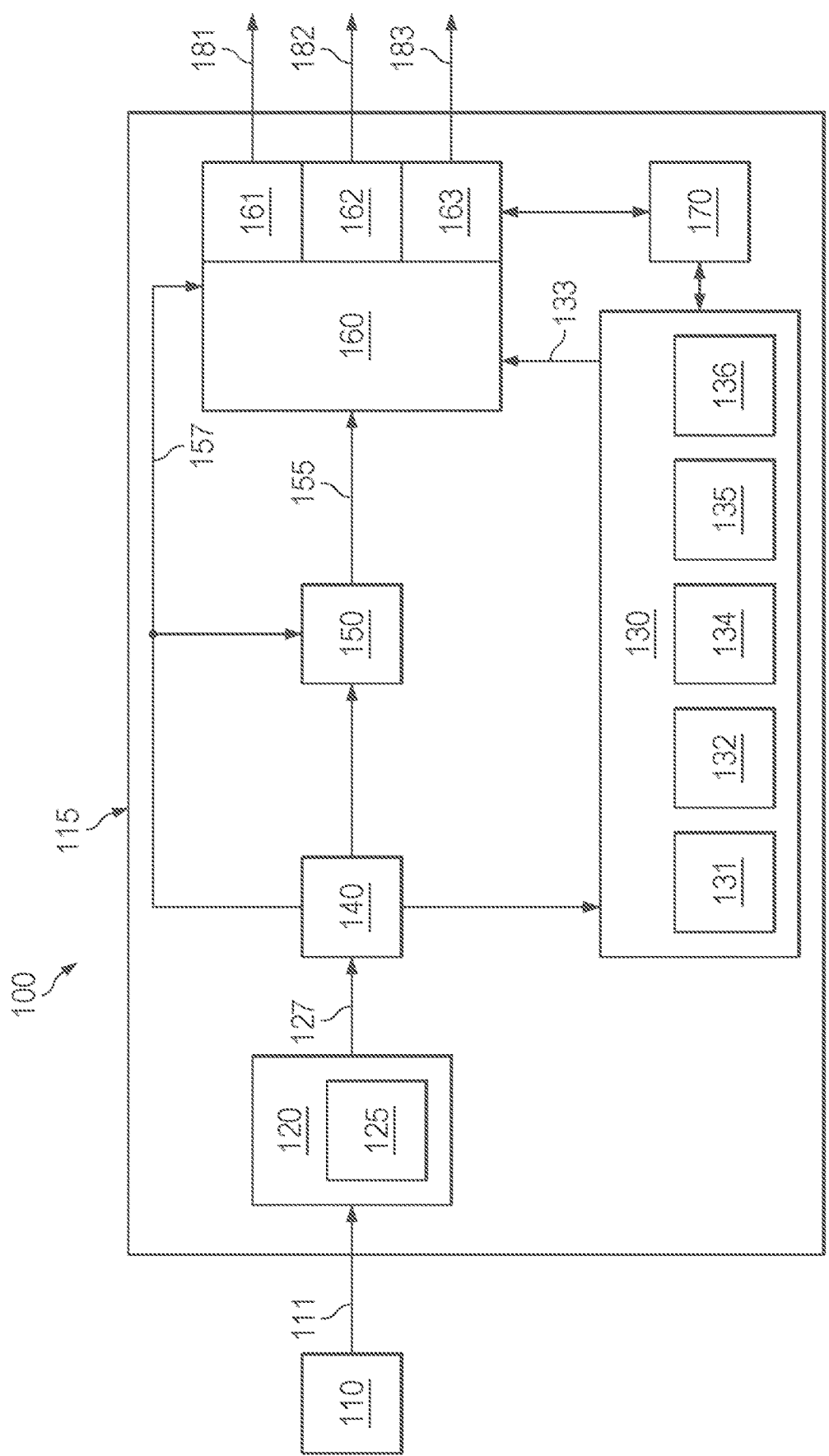
FIG. 1 illustrates one of various examples of a device for network data processing.

FIG. 1 illustrates one of various examples of a device 100 for receiving and transmitting network data transactions. Device 100 may be comprised of primary device 110 and one or more relay devices 115. Relay device 115 may be a switch or a bridge device according to the gPTP protocol.

Primary device 110 may transmit a data frame 111 to one or more relay devices 115, which data frame 111 may be received by a respective relay device 115. Data frame 111 may be transmitted over a single wire or may be transmitted over a bussed connection. Departure timestamp information may be stored in primary device 110, the departure timestamp information reflective of the departure time of the data frame from primary device 110. The data frame may be received at ingress port 120. Ingress port 120 may include timestamp circuit 125. Timestamp circuit 125 may determine arrival timestamp information reflective of the arrival time of the data frame at ingress port 120, the arrival time also referred to as $t_r$. Timestamp circuit 125 may append arrival timestamp information to the received data frame to produce a timestamped data frame 127. Arrival timestamp information may also be termed first timestamp information.

The timestamped data frame 127 may be output by ingress port 120 and may be received by frame analyzer 140. Frame analyzer 140 may control processing of data frames in secondary device 115 via control interface 157, the control based at least on information in the received timestamped data frame 127.

Frame analyzer 140 may forward the timestamped data frame 127 to rewriter circuit 150. Rewriter circuit 150 may receive the timestamped data frame 127 from frame analyzer 140 and frame analyzer 140 may instruct rewriter circuit 150 to modify predetermined data fields in timestamped data frame 127 for at least one egress port. The example of FIG. 1 includes three egress ports, but this is not intended to be limiting. In the example of FIG. 1, frame analyzer 140 may instruct rewriter circuit 150 to modify predetermined data fields in timestamped data frame 127 for egress ports 161, 162 and 163, and rewriter circuit 150 may create a modified and timestamped data frame for respective egress ports 161, 162, and 163. In one of various examples, rewriter circuit 150 may modify the Media Access Control (MAC) address information in the received data frame for respective egress ports 161, 162 and 163. Rewriter circuit 150 may modify other data in the received timestamped data frame 127. The rewriter circuit 150 may forward the modified and timestamped data frames 155 to output circuit 160. Output circuit 160 may contain one or more egress ports. In the example illustrated in FIG. 1, output circuit 160 may contain three egress ports 161, 162 and 163. The output circuit 160 may update timestamp memory 170 with egress timestamp information for respective egress ports 161, 162, 163. Egress timestamp information may be reflective of the departure time of the modified and timestamped data frame 155 at the respective egress ports. The example illustrated in FIG. 1 includes 3 egress ports, 161, 162 and 163, but this is not intended to be limiting. One of various examples may include more egress ports than the number of egress ports illustrated in FIG. 1 or may include fewer egress ports than the number illustrated in FIG. 1. Timestamp memory 170 may be a random-access memory, a first-in first-out (FIFO), or another memory component.

Frame analyzer 140 may additionally forward the timestamped data frame 127 to processor 130. Processor 130 may receive the timestamped data frame 127 from frame analyzer 140. In processor 130, a timestamp extractor 131 may extract the timestamp information, $t_r$, from timestamped data frame 127. Processor 130 may read the egress timestamps, $t_s$, for egress ports from the egress timestamp memory 170. Respective timestamps may be indicated as $t_{sn}$, where n is number from 1 to N, for respective ones of the N egress ports in the timestamp memory 170. Egress timestamps may also be termed second timestamp information.

In one of various examples, a time calculator 132 in processor 130 may calculate the residence time for respective ones of the egress ports, as $t_{sn} - t_r$. The value of $t_{sn}$ may represent the egress port timestamp from timestamp memory 170 as described previously, and the value of $t_r$ may represent the extracted timestamp information as described previously.

In one of various examples, a clock rate extractor 134 in processor 130 may extract clock rate information from the timestamped data frame 127. A clock rate calculator 135 in processor 130 may compute clock rate information based on the extracted clock rate information. Clock rate information computed by the clock rate calculator 135 may include one or more clock rate parameters, including but not limited to RateRatio, Correction Field, peer delay and residence time. A frame generator 136 in processor 130 may update data fields in the timestamped data frame 127 and output an updated and timestamped data frame 133 to output circuit 160. Updated and timestamped data frame 133 may be transmitted on at least one egress port in output circuit 160.

The RateRatio between a primary device and a relay device may be defined as the ratio of the frequency of the grandmaster clock source in the primary device to the frequency of the local clock in the relay device. The neighborRateRatio between two networked devices may be defined as the ratio of the frequency of the clock at the second networked device to the frequency of the clock at the first networked device. The neighborRateRatio may represent the drift in a clock as it traverses between networked devices.

Processor 130 may compute an updated RateRatio (uRR) based on the clock rate information extracted from the timestamped data frame 127, the clock rate information to include an extracted RateRatio (RR) and an extracted NeighborRateRatio (NRR), where the updated RateRatio (uRR) is defined as uRR=RR+NRR.

Figure 2:
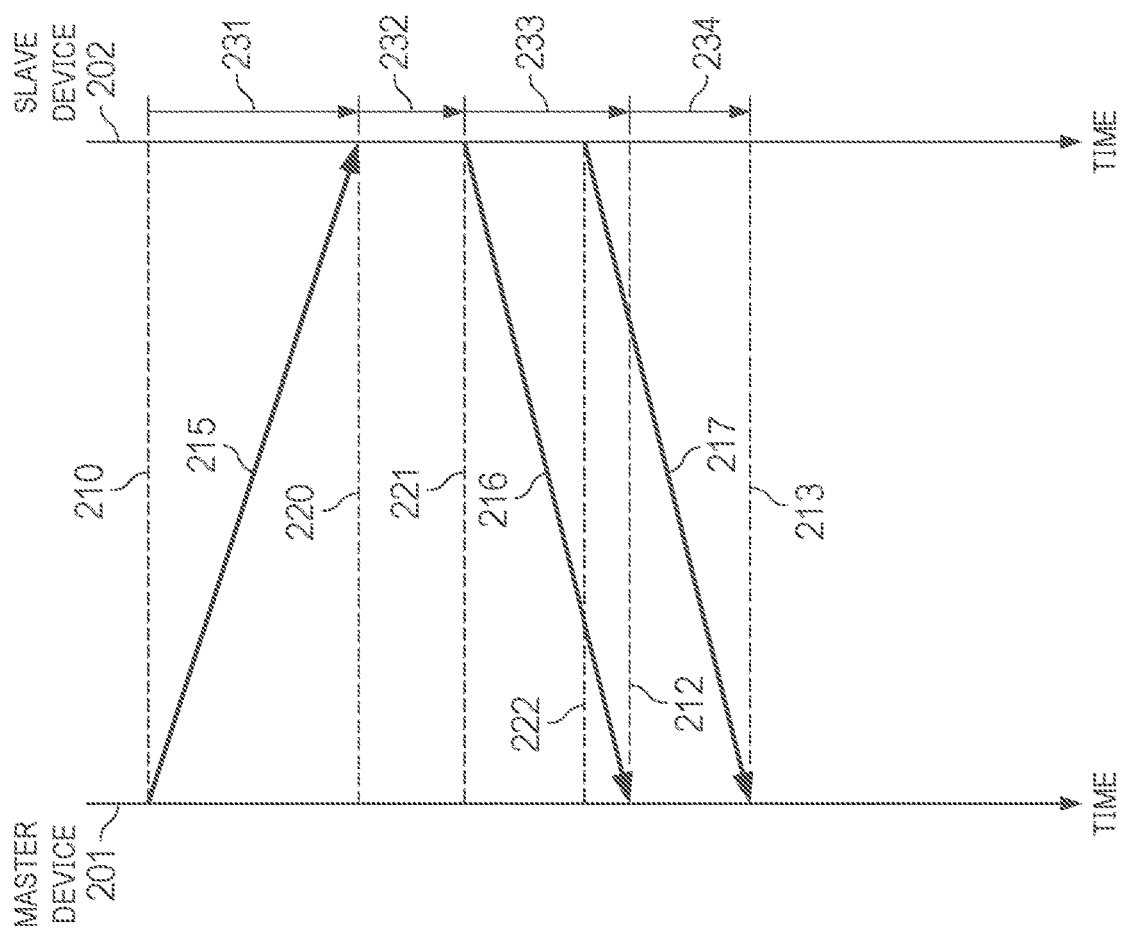
FIG. 2 illustrates one of various examples of a sequence of network data transactions.

In one of various examples, processor 130 may calculate a new Correction Field (nCF) value as nCF=CF+(residence time+peer delay)*uRR, where CF is the correction field extracted from timestamped data frame 127, residence time is the residence time calculated as disclosed previously, peer delay is the peer delay calculated as described in reference to FIG. 2, and uRR is the updated RateRatio calculated as disclosed previously. The frame generator 136 may generate the updated and timestamped data frame 133 based at least on the new Correction Field value and updated RateRatio.

In the example illustrated in FIG. 1, the modified and timestamped data frame 155 received from rewriter circuit 150 may be transmitted at egress port 161 and transmitted over physical link 181. Physical link 181 may be connected to one more network devices. Output circuit 160 may save a timestamp generated at the egress of the modified and timestamped data frame 155 from egress port 161 into timestamp memory 170. Timestamp for egress port 161 may be reflective of the time the modified and timestamped data frame 155 may be transmitted on egress port 161. The timestamp for egress port 161 may be read by processor 130 as disclosed previously. A modified and timestamped data frame 155 may be transmitted at egress port 162 and transmitted over physical link 182. Physical link 182 may be connected to one more network devices. Output circuit 160 may save a timestamp generated at the egress of the modified and timestamped data frame 155 from egress port 162 into timestamp memory 170. Timestamp for egress port 162 may be reflective of the time the modified and timestamped data frame 155 may transmitted on egress port 162. The timestamp for egress port 162 may be read by processor 130 as disclosed previously. A modified and timestamped data frame 155 be transmitted at egress port 163 and transmitted over physical link 183. Physical link 183 may be connected to one more network devices. Output circuit 160 may save a timestamp generated at the egress of the modified and timestamped data frame 155 from egress port 163 into timestamp memory 170. The timestamp for egress port 163 may be reflective of the time the modified and timestamped data frame 155 may be transmitted on egress port 163. The timestamp for egress port 163 may be read by processor 130 as disclosed previously.

FIG. 2 illustrates one of various examples of a sequence of transactions in a network. The sequence of transactions illustrated in FIG. 2 may be part of a procedure to calculate various delays between network components, including but not limited to peer delay and residence time. Peer delay may be defined as the delay in transmitting a message from one networked device to a second networked device. The sequence of transactions illustrated in FIG. 2 may be received and transmitted by a device as illustrated in FIG. 1 or may be received and transmitted by another network device.

Transactions transmitted from, and received at, a primary device 201 are illustrated on the left side vertical axis, and transactions transmitted from, and received at, a secondary device 202 are illustrated on the right side vertical axis. The vertical direction may indicate time. Primary device 201 may represent a bridge device, a switch device, or another network device capable to receive and transmit network transactions. Secondary device 202 may represent a bridge device, a switch device, or another network device capable to receive and transmit network transactions.

Primary device 201 may send a request frame 215 to secondary device 202. Request frame 215 may be sent by primary device 201 at time 210. Time 210 may also be termed $t_1$. The value of time 210 may be stored as a timestamp in a timestamp storage element in primary device 201, including but not limited to a FIFO or random access memory. Request frame 215 may be received at secondary device 202 at time 220. Time 220 may also be termed $t_2$. The time from time 210 to time 220, illustrated as 231, represents the time for the request frame to traverse the physical network from primary device 201 to secondary device 202.

In one of various examples, secondary device 202 may process request frame 215 as described in reference to FIG. 1, and clock rate information may be calculated and data frame fields may be updated.

Secondary device 202 may send response frame 216 at time 221. Time 221 may also be termed $t_3$. Response frame 216 may transmit information from secondary device 202 to primary device 201, the information including but not limited to the value of time 220, i.e. $t_2$. Secondary device 202 may store the timestamp generated when response frame 216 is transmitted, i.e. $t_3$, in a timestamp storage element in slave device 202, including but not limited to a FIFO or random access memory. Response frame 216 may be received at primary device 201 at time 212. Time 212 may also be termed $t_4$. The value of time 212 may be stored as a timestamp in a timestamp storage element in primary device 201, including but not limited to a FIFO or random access memory.

The time duration from time 221 to time 212, illustrated as interval 233, may represent the time for the response frame to traverse the network from secondary device 202 to primary device 201.

Secondary device 202 may send follow-up frame 217 at time 222, which time 222 may be prior to time 212. Follow-up frame 217 may transmit information from secondary device 202 to primary device 201, the information including but not limited to the value of time 221. Follow-up frame 217 may be received at primary device 201 at time 213.

Primary device 201 may include a processor, microcontroller or other processing elements. Primary device 201 may calculate the peer delay between primary device 201 and secondary device 202 based on the time values $t_1$, $t_2$, $t_3$, and $t_4$. The peer delay between primary device 201 and secondary device 202 may be calculated as $$\text{peer delay} = \frac{((t_4 - t_1) - (t_3 - t_2))}{2}.$$

This calculation is based on a symmetric system, where the total time to transmit a message from the primary to the secondary and from the secondary to the primary is divided by two. The peer delay may be calculated using other equations which do not assume a symmetric system.

During transmission of subsequent frames from secondary device 202 to primary device 201, clock rate information may be calculated. A NeighborRateRatio may be computed based on the values of $t_3$ and $t_4$ in subsequent frames, which may represent the difference in clock rates between primary device 201 and secondary device 202. NeighborRateRatio may be defined as $$NRR = \frac{(t'_3 - t_3)}{(t'_4 - t_4)},$$

where $t_3'$ may represent the time secondary device 202 sends a second frame to primary device 201, $t_4'$ may represent the time primary device 201 receives the second frame, $t_3$ may represent the time secondary device 202 sends a first frame to primary device 201, and $t_4$ may represent the time primary device 201 receives the first frame.

Figure 3:
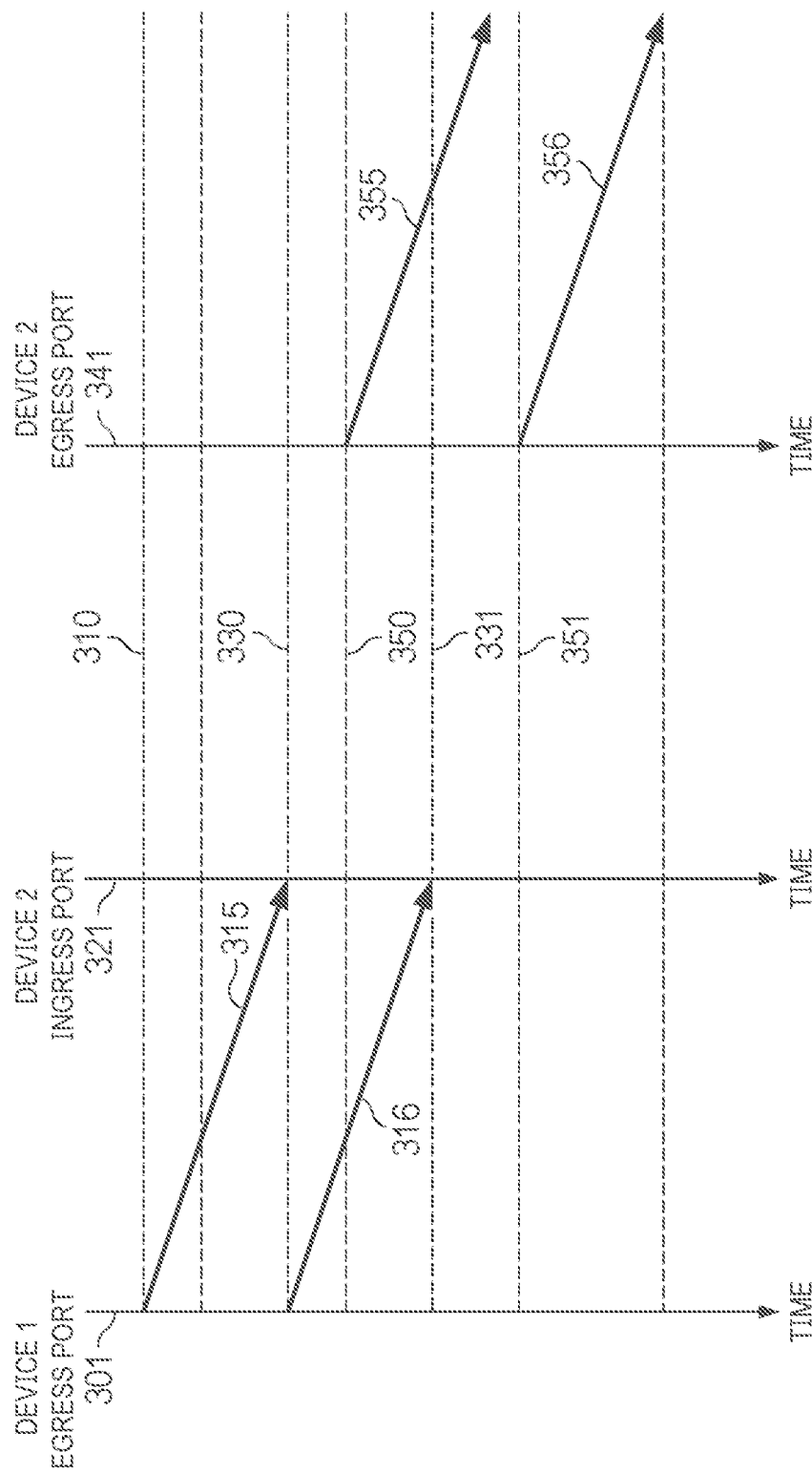
FIG. 3 illustrates one of various examples of a sequence of network data transactions.

FIG. 3 illustrates one of various examples of a sequence of transactions received and transmitted by network devices. The sequence of transactions may be received and transmitted by network devices as described in FIG. 1. The sequence of transactions may be received and transmitted by network devices not illustrated in FIG. 1. In the illustrated example, a device 1 may transmit data to a device 2. Device 2 may transmit data to another node in a network (not shown). Data may be transmitted from device 1 egress port 301 to device 2 ingress port 321 and then output at device 2 egress port 341.

Transactions transmitted by device 1 egress port 301 are illustrated along the left side vertical axis, transactions received by device 2 ingress port 321 are illustrated along the middle vertical axis, and transactions transmitted by device 2 egress port 341 are illustrated along the right side vertical axis. The vertical direction may indicate time. Device 1 and device 2 may respectively represent a bridge device, a switch device, or another network device capable to receive and transmit network transactions. Device 1 and device 2 may represent network devices as described in reference to FIG. 1.

At time 310, device 1 may transmit a sync frame 315 from device 1 egress port 301. Sync frame 315 may be received at device 2 ingress port 321 at time 330. A timestamp circuit in device 2 ingress port 321 may timestamp the arrival time of sync frame 315 at device 2 ingress port 321 as time $t_r$ as described in reference to ingress port 120 of FIG. 1.

Internal circuitry in device 2 may forward the timestamped sync frame to a rewriter circuit and the rewriter circuit may modify sync frame information as described in reference to FIG. 1. A processor in device 2 may calculate the residence time of device 2 and the peer delay between device 1 and device 2 as described previously. A processor in device 2 may calculate the peer delay and neighborRateRatio as described previously. Sync frame 355 may be output at device 2 egress port 341 at time 350, and egress timestamps may be recorded in a timestamp memory, as described in reference to output circuit 160 and timestamp memory 170 of FIG. 1.

At time 330, device 1 may transmit follow-up frame 316 from device 1 egress port 301. In the example illustrated in FIG. 3, the follow-up frame 316 may be transmitted at the same time sync frame 315 is received at device 2 ingress port 321, but this is not intended to be limiting. Follow-up frame 316 may be transmitted by device 1 egress port 301 before or after the arrival of sync frame 315 at device 2 ingress port 321. Follow-up frame 316 may include timing information, including but not limited to RateRatio (RR) and Correction Field information. Follow-up frame 316 may be received at device 2 ingress port 321 at time 331.

Internal circuitry in device 2 may compute an updated RateRatio (uRR) and a new Correction Field (nCF) as described in reference to FIG. 1. Device 2 may generate a follow-up frame 356 for device 2 egress port 341 which may be transmitted at time 351.

In operation, the example as described in FIG. 3 may reduce the residence time as forwarding and processing of data frames is done in hardware. In the example of FIG. 3, device 2 may output a sync frame 355 at time 350, prior to the arrival of the followup frame 316 at time 331.

Figure 4:
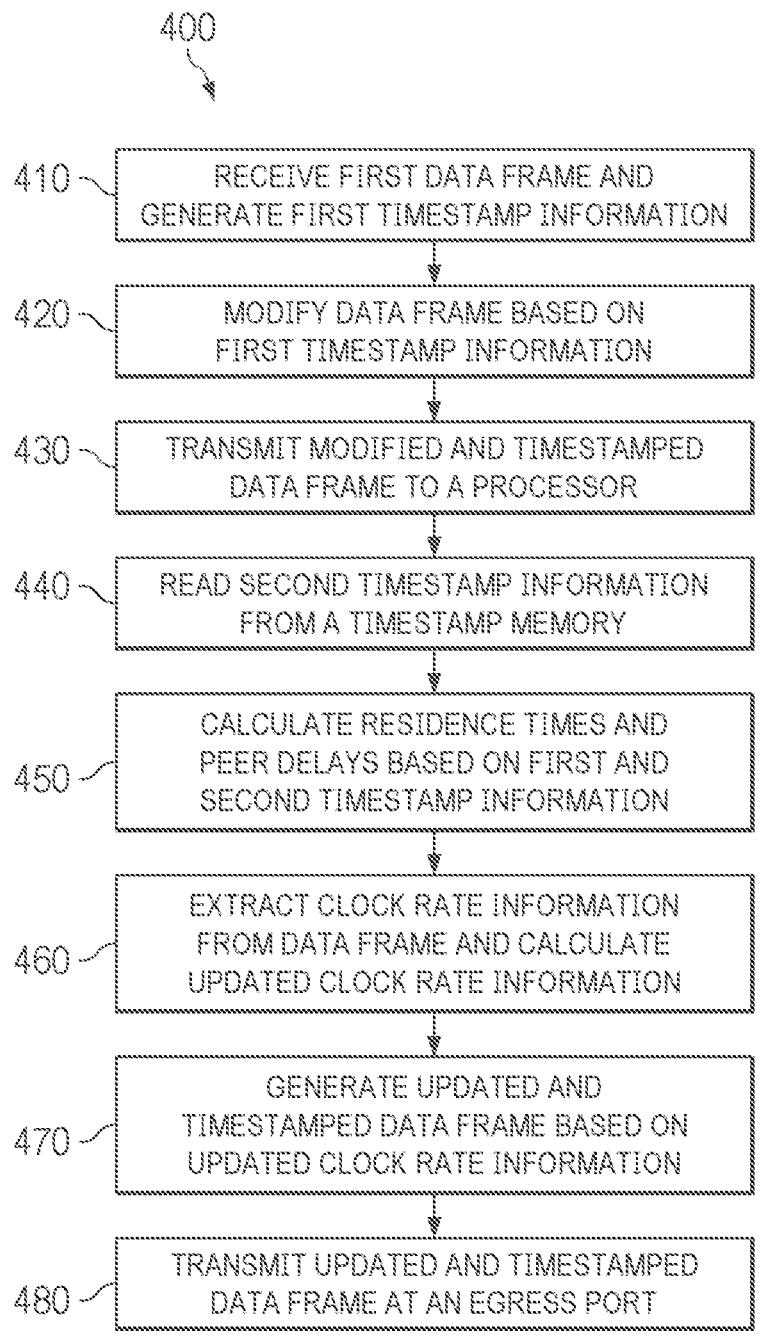
FIG. 4 illustrates a method for network data processing according to one of various examples.

FIG. 4 illustrates a method 400 for network data processing in a network device according to one of various examples.

At operation 410, a network device may receive a first data frame and generate a first timestamp information. At operation 420, the network device may modify the data frame based on the first timestamp information. At operation 430, the network device may transmit the modified and timestamped data frame to a processor. At operation 440, the processor may read second timestamp information from a timestamp memory.

At operation 450, processor may calculate residence times and peer delays based on the first and second timestamp information. At operation 460, processor may extract clock rate information from the modified and timestamped data frame and calculate updated clock rate information. At operation 470, processor may generate an updated and timestamped data frame based on updated clock rate information. At operation 480, network device may transmit updated and timestamped data frame at an egress port.

The invention claimed is:

1. A device comprising:
   an ingress port comprising a timestamp circuit to determine a first timestamp information based on a received data frame and to update the received data frame based on the first timestamp information to create a timestamped data frame, the ingress port to output the timestamped data frame;
   an output circuit comprising one or more egress ports to receive updated and timestamped data frames and modified and timestamp data frames, wherein the egress ports comprise a timestamp circuit to determine egress timestamp information and to save egress timestamp information to a timestamp memory, the output circuit to output data frames;
   a frame analyzer to receive the timestamped data frame from the ingress port and forward the timestamped data frame to a processor, the processor comprising:
      a timestamp extractor to extract the first timestamp information from the timestamped data frame and to read egress timestamp information from the timestamp memory;
      a time calculator with inputs coupled to receive the first timestamp information and egress timestamp information, the time calculator to calculate a residence time based at least on the first timestamp information and egress timestamp information;
      a clock rate extractor to extract clock rate information from the timestamped data frame;
      a clock rate calculator to receive the extracted clock rate information from the clock rate extractor, and to update one or more clock rate parameters;

a frame generator with an output coupled to provide data frames to the output circuit, the frame generator to generate a data frame based at least on updated clock rate parameters from the clock rate calculator, and a rewriter circuit with an input coupled to the output of the frame analyzer, the rewriter circuit to modify the received data frame from the frame analyzer and to output the modified and timestamped data frame to the one or more egress ports of the output circuit.

2. The device as claimed in claim 1, wherein the rewriter circuit modifies the received data frame based at least on information in the received data frame.

3. The device as claimed in claim 1, wherein the timestamp memory is a first-in, first-out memory.

4. The device as claimed in claim 1, wherein the clock calculator calculates clock information based at least on the extracted clock rate information.

5. A system comprising:
a plurality of network devices, wherein respective ones of a plurality of network devices are coupled to at least one other of the plurality of network devices, each respective ones of the network devices comprising:
an ingress port comprising a timestamp circuit to determine a first timestamp information based on a received data frame and to update the received data frame based on the first timestamp information to create a timestamped data frame, the ingress port to output the timestamped data frame;
an output circuit comprising one or more egress ports to receive updated and timestamped data frames and modified and timestamp data frames, wherein the egress ports comprise a timestamp circuit to determine egress timestamp information and save egress timestamp information to a timestamp memory, the output circuit to output data frames;
a frame analyzer to receive the timestamped data frame from the ingress port and forward the timestamped data frame to a processor, the processor comprising:
a timestamp extractor to extract the first timestamp information from the timestamped data frame and to read egress timestamp information from a timestamp memory;
a time calculator with inputs coupled to receive the first timestamp information and egress timestamp information, the time calculator to calculate a time value based at least on the first timestamp information and the egress timestamp information;
a clock rate extractor to extract clock rate information from the timestamped data frame;
a clock rate calculator to receive the extracted clock rate information from the clock rate extractor and to update one or more clock rate parameters;
a frame generator with an output coupled to provide data frames to the output circuit, the frame generator to generate a data frame based at least on updated clock rate parameters from the clock rate calculator, and
a rewriter circuit with an input coupled to the output of the frame analyzer, the rewriter circuit to modify the received data frame from the frame analyzer and to output the modified and timestamped data frame to the one or more egress ports of the output circuit.

6. The system as claimed in claim 5, wherein the rewriter circuit modifies the first received data frame based on information in the first received data frame.

7. The system as claimed in claim 5, wherein the timestamp memory comprises a first-in first-out memory.

8. The system as claimed in claim 5, wherein the time calculator calculates a residence time and peer delay of the first received data frame based at least on the first received data frame.

9. The system as claimed in claim 5, wherein the clock rate extractor computes updated clock rate information based at least on the extracted clock rate information.

10. A method comprising:
receiving a first data frame at an ingress port and generating a first timestamped data frame at the ingress port,
transmitting first timestamped data frame to a processor,
extracting the first timestamp information from the first data frame;
reading a second timestamp information from a timestamp memory;
calculating residence times and peer delays based on the first and second timestamp information;
extracting clock rate information from the first data frame;
calculating updated clock rate information based at least on the extracted clock rate information;
generating an updated and timestamped data frame based at least on the updated clock rate information, and
transmitting the updated and timestamped data frame on an egress port.

11. The method as claimed in claim 10, the method comprising saving timestamp information in a timestamp memory.

12. The method as claimed in claim 10, the extracting clock rate information comprising computing updated clock rate information based at least on the extracted clock rate information.

* * * * *